United States Patent
Lewis (10) Patent No.: US 9,606,697 B1
(45) Date of Patent: Mar. 28, 2017

(54) DISPLAY CURSOR FOR MOTION CONTROLLER

(71) Applicant: Google Inc., Mountain View, CA (US)

(72) Inventor: Thor Lewis, San Francisco, CA (US)

(73) Assignee: Google Inc., Mountain View, CA (US)

(*) Notice: Subject to any disclaimer, the term of this patent is extended or adjusted under 35 U.S.C. 154(b) by 301 days.

(21) Appl. No.: 14/554,230

(22) Filed: Nov. 26, 2014

Related U.S. Application Data (60) Provisional application No. 62/078,296, filed on Nov. 11, 2014.

(51) Int. Cl.
G06F 3/0481 (2013.01)

(52) U.S. Cl.
CPC ............... *G06F 3/04812* (2013.01)

(58) Field of Classification Search
None
See application file for complete search history.

(56) References Cited

U.S. PATENT DOCUMENTS

| | | | |
|---|---|---|---|
| 5,565,891 A | 10/1996 | Armstrong | |
| 5,729,673 A * | 3/1998 | Cooper | H04N 5/2628 345/419 |
| 8,085,243 B2 | 12/2011 | Yamashita et al. | |
| 8,212,784 B2 | 7/2012 | Popp | |
| 8,674,932 B2 | 3/2014 | Armstrong | |
| 8,693,724 B2 | 4/2014 | Ahmed et al. | |
| 2009/0319097 A1 | 12/2009 | Bandera et al. | |
| 2011/0304557 A1 | 12/2011 | Wilburn et al. | |
| 2012/0028706 A1* | 2/2012 | Raitt | A63F 13/10 463/31 |
| 2012/0110516 A1 | 5/2012 | Tumanov | |
| 2013/0002534 A1 | 1/2013 | Braun et al. | |
| 2013/0076615 A1 | 3/2013 | Iao | |
| 2013/0257748 A1 | 10/2013 | Ambrus et al. | |
| 2014/0055352 A1 | 2/2014 | Davis et al. | |
| 2014/0270352 A1 | 9/2014 | Fujimura | |
| 2014/0282161 A1 | 9/2014 | Cash | |

FOREIGN PATENT DOCUMENTS

WO 01/41053 6/2001

* cited by examiner

*Primary Examiner* — Yingchun He
(74) *Attorney, Agent, or Firm* — McDonnell Boehnen Hulbert & Berghoff LLP (57) ABSTRACT

An example method includes providing for display on an interface of a cursor comprising a geometric representation with two opposing flaps connected to a perimeter of the geometric representation. The method may further include receiving input data from a motion controller indicative of translation of a view of the interface in a direction parallel to the view. The method may also include responsively providing for animation of the two opposing flaps of the cursor to rotate the two opposing flaps about the perimeter of the geometric representation on the interface in a direction opposite the translation.

20 Claims, 9 Drawing Sheets

Interactive Display System 100

Podium Components
- Upper Podium 102
- Lower Podium 104
- Podium Base 106
- Up/Down Button 108
- Touchscreen 110
- Six-axis Controller 112
- Depth Sensor 114
- Podium Speakers 116
- Microphone Array 118
- Proximity Sensor 120
- Tactile Transducers 122

Floor Components
- Rubber Standing Area 132
- White LED Strips 134
- Elevated Platform 136
- Colored LED Strips 138
- Seating 140

Screen Components
- Screen Chamber 152
- Screen Panels 154
- Screen Speakers 156
- Camera 158
- Removable Panels 160

Control System 180

DISPLAY CURSOR FOR MOTION CONTROLLER

CROSS REFERENCE TO RELATED APPLICATION

The present application claims priority to U.S. Provisional patent application Ser. No. 62/078,296, filed on Nov. 11, 2014, and entitled "Display Cursor for Motion Controller," which is herein incorporated by reference as if fully set forth in this description.

BACKGROUND

Unless otherwise indicated herein, the materials described in this section are not prior art to the claims in this application and are not admitted to be prior art by inclusion in this section.

A computing system may provide a user with an interactive experience for any number of different applications, including navigation, gaming, shopping, or the presentation of other types of data or information. Such a computing system may include one or more different input devices that allow a user to instruct or otherwise communicate information to the system. For example, the system may include an input device such as a touchpad that allows a user to provide input through touch, a pointing device that allows a user to input spatial data to the system, or a microphone that allows a user to provide input through speech. Based on information received from the input device, the computing system may provide output back to the user. For instance, the system may include an output device such as a video screen to provide a user with visual feedback or speakers to provide a user with auditory feedback. In some systems, the feedback may be adjusted based on input provided by the user in order to provide the user with an interactive experience.

SUMMARY

Example embodiments relate to display of a cursor that may help to provide indications of how a view is moving in response to input from a motion controller. The cursor may include a geometric representation such as a ring with opposing flaps that are connected to a perimeter of the geometric representation. Input data from a motion controller, such as a six-axis controller, may be received indicating translation of a view of an interface in a direction parallel to the view. For instance, the view may be zoomed in or zoomed out. In response, the opposing flaps of the cursor may be animated to rotate relative to the perimeter of the geometric representation in a direction opposite the direction of the translation.

In one example, a method is provided that includes providing for display on an interface of a cursor comprising a geometric representation with two opposing flaps connected to a perimeter of the geometric representation. The method may further include receiving input data from a motion controller indicative of translation of a view of the interface in a direction parallel to the view. The method may also include responsively providing for animation of the two opposing flaps of the cursor to rotate the two opposing flaps about the perimeter of the geometric representation on the interface in a direction opposite the translation.

In a further example, a system is provided that includes a motion controller and a control system. The control system may be configured to provide for display on the display interface of a cursor comprising a geometric representation with two opposing flaps connected to a perimeter of the geometric representation. The control system may be further configured to receive input data from the motion controller indicative of translation of a view of the display interface in a direction parallel to the view. The control system may also be configured to responsively provide for animation of the two opposing flaps of the cursor to rotate the two opposing flaps about the perimeter of the geometric representation on the display interface in a direction opposite the translation.

In another example, a non-transitory computer readable medium having stored instructions, that when executed by one or more computing systems, cause the one or more computing systems to perform functions is disclosed. The functions may include providing for display on an interface of a cursor comprising a geometric representation with two opposing flaps connected to a perimeter of the geometric representation. The functions may further include receiving input data from a motion controller indicative of translation of a view of the interface in a direction parallel to the view. The functions may also include responsively providing for animation of the two opposing flaps of the cursor to rotate the two opposing flaps about the perimeter of the geometric representation on the interface in a direction opposite the translation.

In yet another example, a system may include means for providing for display on an interface of a cursor comprising a geometric representation with two opposing flaps connected to a perimeter of the geometric representation. The system may further include means for receiving input data from a motion controller indicative of translation of a view of the interface in a direction parallel to the view. The system may also include means for responsively providing for animation of the two opposing flaps of the cursor to rotate the two opposing flaps about the perimeter of the geometric representation on the interface in a direction opposite the translation.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

Example embodiments relate to a graphical cursor displayed on an interface to help orient a user. A movement controller, such as a six-axis controller, may allow for control of a view shown on a display screen. For instance, manipulation of the controller may cause navigation through different views of the Earth on the display screen. A cursor may be displayed as a geometric representation such as a circle overlaid on the current view of the Earth shown on the display screen. As the view is navigated by the controller, the cursor may be animated to give visual feedback indicative of motion along different degrees of freedom. This animation may help connect the digital world to a view of the physical world to prevent a user from getting disoriented while controlling the view on the screen. Additionally, the cursor may be represented in a simple and clean form to avoid distracting a user.

Within examples, the cursor may include a geometric representation with two opposing flaps connected to a perimeter of the geometric representation. For instance, the cursor may include a ring (e.g., a circular shape) with opposing arcs connected to each of the opposing flaps. Additionally, the portions of the ring between the opposing arcs may fade to become transparent on the screen. Different geometric representations including different shapes such as ovals or squares with connected flaps could also be used for the cursor.

When a motion controller causes the view on a display screen to zoom in or zoom out, the opposing flaps of the cursor may rotate in the opposite direction relative to the perimeter of the ring. Accordingly, the cursor may provide a visual effect that simulates flying by causing the flaps to twist in a way that simulates air pushing on the flaps. For instance, a display screen may show a view of the Earth from above that is controlled by a six-axis controller. When the controller is pulled up to move the view away from the Earth, the flaps of the cursor will twist downward to simulate air pushing them down. Conversely, when the controller is pushed down to move the view towards the Earth, the flaps of the cursor will rotate upward to simulate air pushing them up. In some examples, subtle movements of the view up or down may cause a smaller degree of flap rotation, while bigger movements up or down cause a greater degree of flap rotation.

In additional examples, the ring and the connected flaps of the cursor may also be used to indicate when the controller is rotating the view (e.g., a steering wheel turn on a six-axis controller). As the controller is turned, the rotation of the flaps on the cursor may help to indicate the direction and magnitude of the rotation. In further examples, when the view has reached a limit on a range of rotational motion, part of the ring connected to one of the flaps of the cursor (e.g., the flap that is lower on the screen) may fade to become transparent. This effect may indicate that further rotation in the same direction is not possible.

In further examples, the cursor may include an outer ring displayed outside the inner ring with the two opposing flaps. In some examples, actions of the outer ring may be determined independently of actions of the inner ring, but may be displayed simultaneously to show different directions of movement. The outer ring may contain an arrow to indicate when the motion controller causes horizontal translation of the view (e.g., left, right, forward, or backward). If the motion controller changes the horizontal translation to a different direction, the array may then rotate around the outer ring to point in the new direction of translation.

In additional examples, the cursor may tilt on the display screen to indicate when the motion controller has tilted the view forward or backward. In some examples, the part of the cursor which is tilted toward the direction of the view may become more opaque while the part that is tilted away from the direction of the view may become more transparent. This effect may provide an intuitive feel for which direction the view is tilting. In the example where the cursor includes a ring with two transparent sections in between the arcs connected to the flaps, the transparent section of the ring tilted toward the direction of the view may become smaller while the transparent section of the ring tilted away from the direction of the view becomes larger. If the cursor includes an inner ring and an outer ring, both rings may tilt together in the direction that the view is tilting.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

Example embodiments involve a system that provides an interactive user experience through a variety of possible input and output devices. A number of different possible types of user experiences may be created using the systems and methods described herein, including applications in navigation, gaming, product demonstration, and web searching. For illustration purposes, some figures and examples are described in the context of navigation around the Earth or a different physical environment. Numerous other applications are also possible. Additionally, certain types of input devices and output devices are described as part of an illustrative example system, but the system may not include every type of device or interface described or illustrated, and may also include one or more types of devices or interfaces not explicitly shown. Additionally, any or all of the components described and illustrated could be placed in different arrangements, combined, or separated in different ways as well.

Figure 1A:
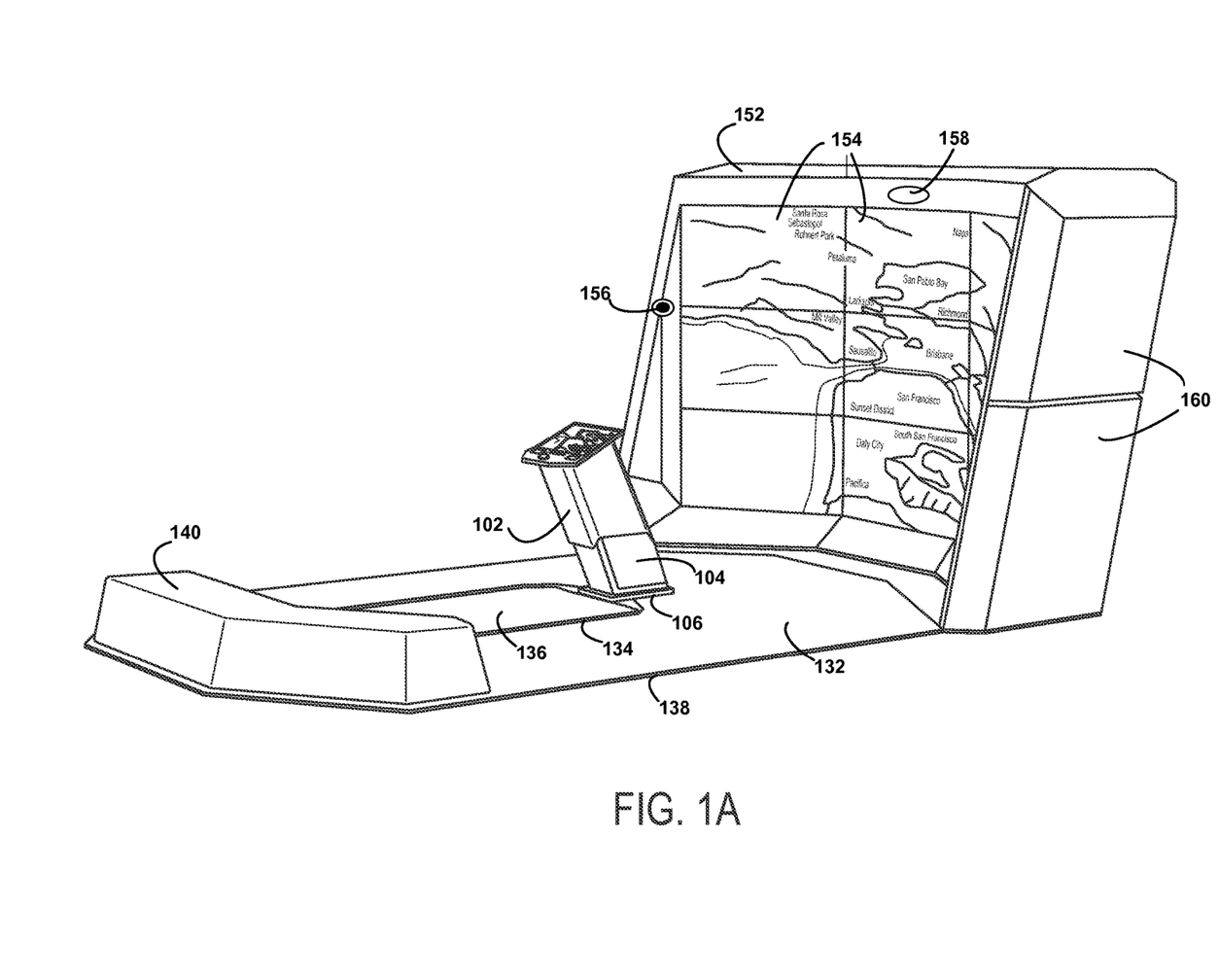
FIG. 1A shows a view of an interactive display system, according to an example embodiment.
Figure 1B:
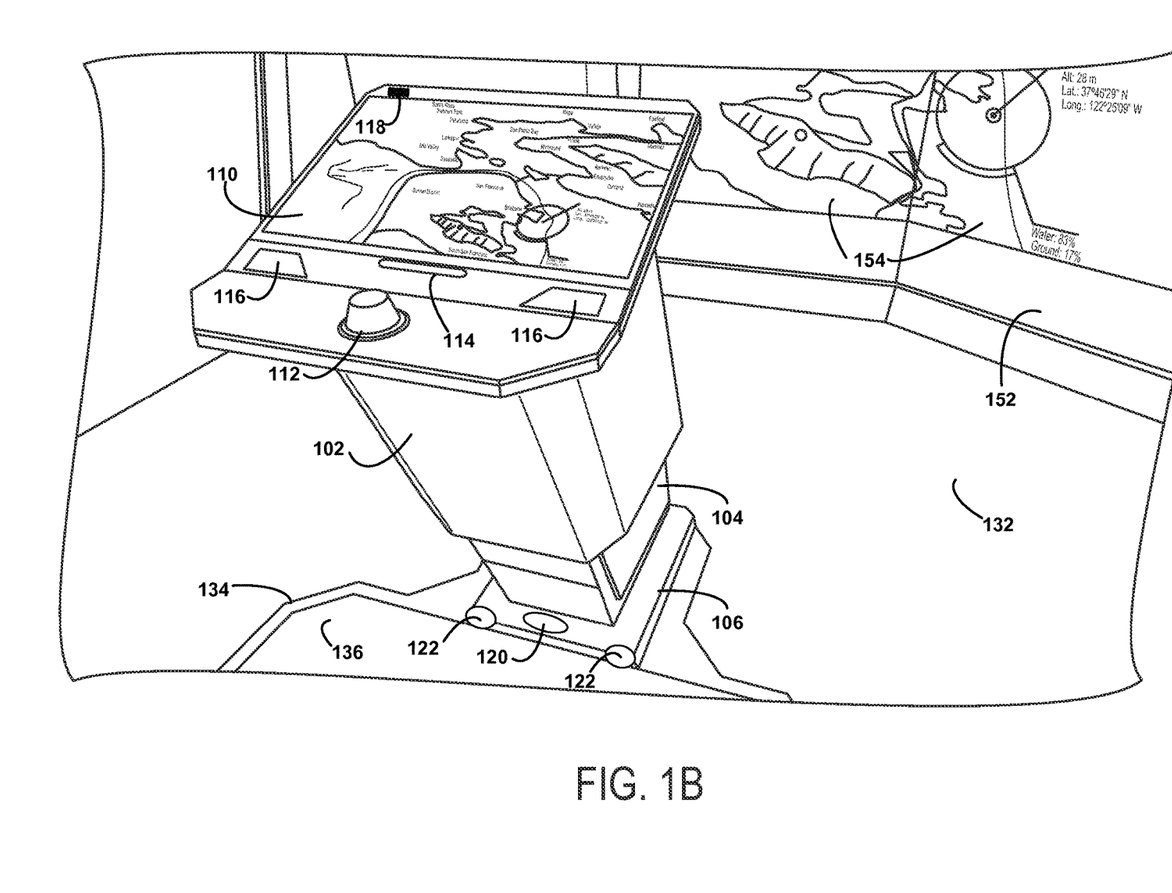
FIG. 1B shows another view of an interactive display system, according to an example embodiment.
Figure 1C:
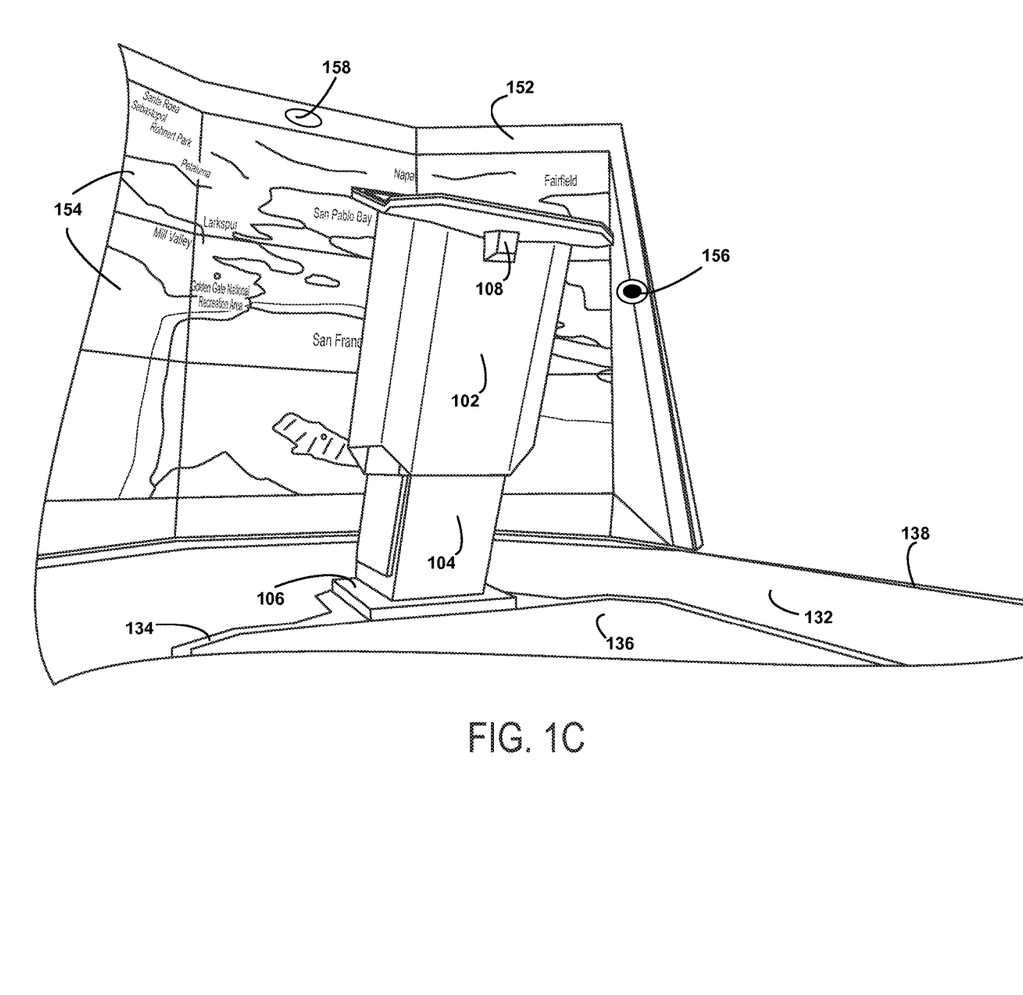
FIG. 1C shows a further view of an interactive display system, according to an example embodiment.
Figure 1D:
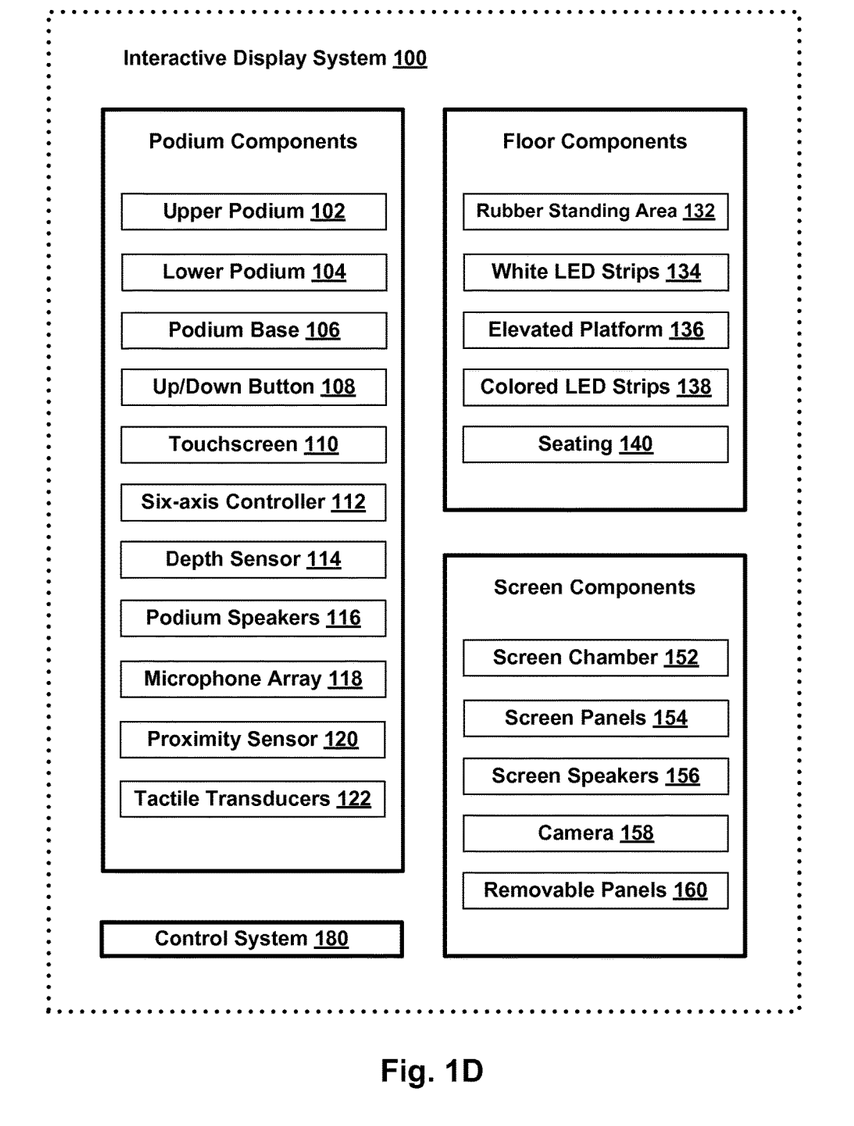
FIG. 1D is a functional block diagram illustrating components of an interactive display system, according to an example embodiment.

FIGS. 1A, 1B, and 1C illustrate different views of an interactive display system, according to example embodiments. Additionally, FIG. 1D is a functional block diagram illustrating components of an example interactive display system. As shown in FIG. 1D, the components may generally be divided into a first group of components positioned on or within a podium that allows for user interaction, a second group of components positioned on or within a floor section on which the podium is placed, and a third group of components positioned on or within a large screen in front of the podium. In other examples, some of the components could be included in a different group and/or positioned elsewhere within the system.

As illustrated in FIGS. 1A, 1B, and 1C, a podium may include a variety of different types of input and/or output components to facilitate interaction with a user standing in front of the podium. In some examples, the podium includes an upper podium 102 and a lower podium 104. The upper podium 102 may be configured to slide or otherwise move up and down relative to the lower podium 104. For instance, an up/down control button 108 may permit the upper podium 102 to be moved up or down when the control button 108 is pressed. Within examples, the height of the podium can be adjusted to accommodate users of different heights. In some cases, the system may detect the presence of a user in front of the podium and automatically adjust the height of upper podium 102 to accommodate the user. The shape and/or size of the podium may be varied from the examples illustrated within FIGS. 1A, 1B, and 1C.

In further examples, lower podium 104 is attached to podium base 106. The podium base 106 may be capable of rotation in order to rotate the podium to accommodate people who are not standing directly in front of the podium. In some examples, the system may detect a person nearby and automatically rotate the podium using podium base 106 in order to align the podium with the person to allow the person to interact with one or more interfaces on the podium. In another example, the podium base 106 may be capable of a 180 degree turn so that the podium faces away from the big screen. Such a configuration may allow the podium to serve as a lectern for a person to give a speech with the big screen providing visual content for a presentation.

The podium may include a number of different types of interactive elements to allow a user to provide instructions or input to the system and/or to allow the system to provide feedback or output back to the user. In an example system, one or more components are placed on a top surface of upper podium 102. The top surface of upper podium 102 may be aligned at an angle (e.g., 25 degrees from horizontal) that facilitates interaction with the components by a user standing in front of the podium. In further examples, some or all of the components may be positioned elsewhere on the podium.

In some examples, the podium includes a touchscreen 110, an electronic visual display that may be controlled by a user who touches the screen with one or more fingers or an object such as a stylus. In some examples, the images displayed on touchscreen 110 may mimic the images displayed on the big screen in front of the podium. Accordingly, the system allows a user to stay oriented when moving her eyes between looking at the touchscreen 110 on the podium and the big screen in front of the podium. For instance, as shown in FIGS. 1A, 1B, and 1C, both the touchscreen 110 and the big screen may show the same view of the Earth along with the same graphical user interface elements. The touchscreen 110 may allow users to change the images displayed on both screens through touch input, for example, to navigate around the Earth or to select particular areas on the Earth to display more information.

In further examples, the podium additionally includes a six-axis controller 112, which may be used to control what is displayed on the big screen in front of the podium. For instance, the six-axis controller 112 may allow a user to navigate around the Earth by controlling different degrees of freedom of a view shown on the screen (e.g., simulating motion of a camera). Pulling up or pushing down on the controller 112 may cause the view to translate in a direction parallel to the view (e.g., to cause a view of the Earth to zoom in or zoom out). Moving the controller 112 left, right, forward, or backward may cause the view to pan left, right, up, or down. Additionally, tilting the controller 112 forward or backward may cause the view to tilt forward or backward. Further, spinning the controller 112 left or right (e.g., a steering wheel turn) may cause the view to rotate in the same direction. Also, tilting the controller 112 left or right may cause the view to tilt left or right. In some examples, the view may not be allowed to tilt left or right, in which case only the other five degrees of freedom may be controlled by the controller 112. Depending on the application, the different possible motions of the controller 112 may have different effects on the output displayed on the big screen as well.

In additional examples, the podium includes a depth sensor 114, which may detect movements of a user's hands or fingers over the depth sensor 114. In some examples, the system may use data from the depth sensor 114 to identify movements (e.g., translations or rotations) of a user's hand as a single object. The movements may then be used to control some aspect displayed on the big screen. In further examples, the system may also use data from the depth sensor 114 to identify certain gestures such as a hand flick, hand waving, or finger pointing. These actions by the user may control different aspects of the presentation on the screen.

In some examples, the depth sensor 114 may generate a hover signal to indicate when a user is hovering her hand over the depth sensor 114. Additionally, the depth sensor 114 may be positioned relative to the touchscreen 110 such that data from the depth sensor 114 indicates where a user is hovering her hand over the touchscreen 110. Accordingly, movements of a user's hand over an image on the touchscreen 110 may produce a visual effect at the same location of the image on the big screen in front of the podium. In some examples, the hover signal may be used to control a heads-up display (HUD) window overlaid on a portion of the screen. The user may control the location of the HUD by moving her hand (e.g., increasing the area covered by the HUD by moving her hand further from the depth sensor). In some examples, the HUD may allow the user to visualize certain pieces of data corresponding to the area covered by the HUD (e.g., the population within the area).

In further examples, the podium may include one or more speakers 116, which may be used by the system to send audio feedback to the user. For instance, the speakers 116 may produce sound indicative of movement when a person uses the six-axis controller 112 to change the view on the big screen (e.g., to navigate around the Earth). In other examples, sound from the speakers 116 may be coordinated with user input actions on the touchscreen 110 and/or the depth sensor 114 as well or instead.

In additional examples, the podium may include a microphone array 118, which may detect audio signals. The microphone array 118 may allow the system to detect and process vocal commands from the user. For instance, a user may give the system a voice command through the microphone array 118 to change the view on the big screen, ask for instructions, or switch to a new application. In some examples, the microphone array 118 may also allow a user to engage in a video conference call with another person displayed on the big screen.

In further examples, the podium may include a proximity sensor 120. The proximity sensor 120 may be positioned on the front side of the podium (e.g., at or near the base) in order to detect the presence of a person in front of the podium. In some examples, interactive features may be activated when the proximity sensor 120 detects a user in front of the podium. For instance, the touchscreen 110 may automatically turn on in order to enable the user to begin interacting with the system. In additional examples, one or more features may also be deactivated when the proximity sensor 120 detects that a user has moved away from the podium.

In additional examples, the podium may include one or more tactile transducers 122 positioned at or near the base of the podium to produce signals at frequencies that can be felt by a user standing in front of the podium. In some cases, two tactile transducers 122 can be positioned on either side of the podium in order to produce signals felt separately by a user's left and right feet. For instance, in an example application where a user is maneuvering the six-axis controller 112 to navigate around the Earth on the big screen, the tactile transducers 122 may be used to produce haptic effects that make the user feel like he is flying (e.g., a rumbling effect may be produced when the user is navigating rapidly through the environment).

Interactive display system 100 may additionally include one or more components positioned on the floor around the podium in front of the big screen. These components may facilitate an interactive experience between the system and a person standing in front of the podium and/or one or more other people nearby. In some cases, the components of the floor may be designed so that the entire system can be quickly installed in different locations without requiring additional infrastructure in each location.

In some examples, the floor may include a rubber standing area 132 that extends out from the big screen and encompasses the podium. The standing area 132 may demarcate a section in which people can see visual effects on the big screen or experience other aspects of an interactive experience. The standing area 132 may additionally include an incline ramp around the edge for accessibility.

In further examples, the floor may also include white LED strips 134 which extend from the podium to surround an area in front of the podium. The white LED strips 134 may indicate to a user where to stand in order to operate controls on the podium and/or to experience other aspects of the system. In some examples, the white LED strips 134 may light up when a user enters the area of the floor encompassed by the LED strips in order to indicate that the user is connected to the system. For instance, the white LED strips 134 may illuminate based on sensor data from the proximity sensor 120 indicating that a person has entered the space in front of the podium.

In additional examples, the floor may include an elevated platform 136 positioned in front of the podium, which may optionally be surrounded by the white LED strips 134. The elevated platform 136 may allow for vibration of the platform 136 without affecting the surrounding rubber standing area 132. Accordingly, the tactile transducers 122 may be used to provide targeted haptic effects to a user standing on the elevated platform 136 that may only be felt by the user.

The floor may also include colored LED strips 138 wrapped around the rubber standing area 132. The colored LED strips 138 may help to segment the entire system from the surrounding environment. In some examples, colors on the LED strips 138 may be changed to correspond to different aspects of the interactive experience. In additional examples, the other components of the system such as the podium and the chamber for the big screen may be white, which may provide a visual effect of color flowing around a white base.

The floor may additionally including seating 140 to allow other people to experience aspects of a presentation in addition to the person at the podium. In some examples, certain effects (e.g., vibration from elevated platform 136) may only be experienced by a person at the podium, while other effects (e.g., images on the big screen) may be experienced by people sitting on the seating 140. The seating 140 could also be easily removable fixtures to allow the system to adapt to different types of applications or environments.

Interactive display system 100 may additionally include a screen positioned in front of the podium for display of visual content, such as a view of the Earth. A user may be able to control the view on the screen and/or the information displayed on the screen through one or more input mechanisms, such as the touchscreen 110, the six-axis controller 112, or the depth sensor 114 on the podium. An example arrangement of the podium and big screen is illustrated in FIGS. 1A, 1B, and 1C, but the podium and screen may have different sizes, shapes, or relative positioning in other examples as well.

The big screen in front of the podium may include a screen chamber 152 which houses a number of different screen panels 154. For instance, in one example, the chamber 152 may house nine 55 inch screen panels 154 arranged in a three by three grid. The chamber 152 may be shaped to allow for a 30 degree angle between horizontally contiguous screen panels. This arrangement may allow a user to visualize a larger field of view than a flat arrangement of panels without wrapping too far around a user's peripheral, which may disorient the user. In some example applications, each of the screen panels 154 may display a different section of a single view (e.g., the view of the Earth from a single viewpoint). In other applications, one or more of the screen panels 154 may display different views and/or different types of content as well.

In further examples, the screen chamber 152 may include one or more screen speakers 156 to provide audio content to a user. In one example, the screen chamber 152 may house left and right speakers 156, which could provide targeted audio signals toward a user standing in front of the podium. In other examples, the speakers 156 could provide some or all of the audio content to anybody standing within the rubber standing area 132 as well.

In additional examples, the screen chamber 152 may also include a camera 158 positioned above the screen panels 154. The camera 158 may be directed towards the podium to enable a user standing at the podium to engage in a video conference call. For instance, a user at the podium may be able to speak to another person displayed on one or more of the screen panels 154 while video of the user is captured by camera 158 and audio is captured using the microphone array 118 on the podium.

In some examples, the screen chamber 152 may include one or more removable panels 160, including side and/or rear panels. By employing removable panels, the system may be easily adapted to different applications and/or to different types of environments. For instance, the side panels may only be used in areas with other displays nearby, so that visual or audio content from the system does not disrupt the other displays. The screen chamber 152 may be shaped or constructed in other ways as well.

Interactive display system 100 may also include control system 180, which may provide instructions to one or more of the other components of the system. For instance, control system 180 may process data received from one or more input devices and determine responsive output to be produced by one or more output devices. Control system 180 may include at least one processor (which could include at least one microprocessor) that executes instructions stored in a non-transitory computer readable medium. Control system 180 may also represent a plurality of computing devices that may serve to control individual components or subsystems of interactive display system 100 in a distributed fashion. For instance, any of the input and output devices of the system may have their own local control systems, which could optionally serve as master control systems for other devices. Control system 180 could also include one or more remote computing systems that communicate control instructions to one or more components of the system. The control functions of control system 180 could be distributed in other ways as well.

Figure 2:
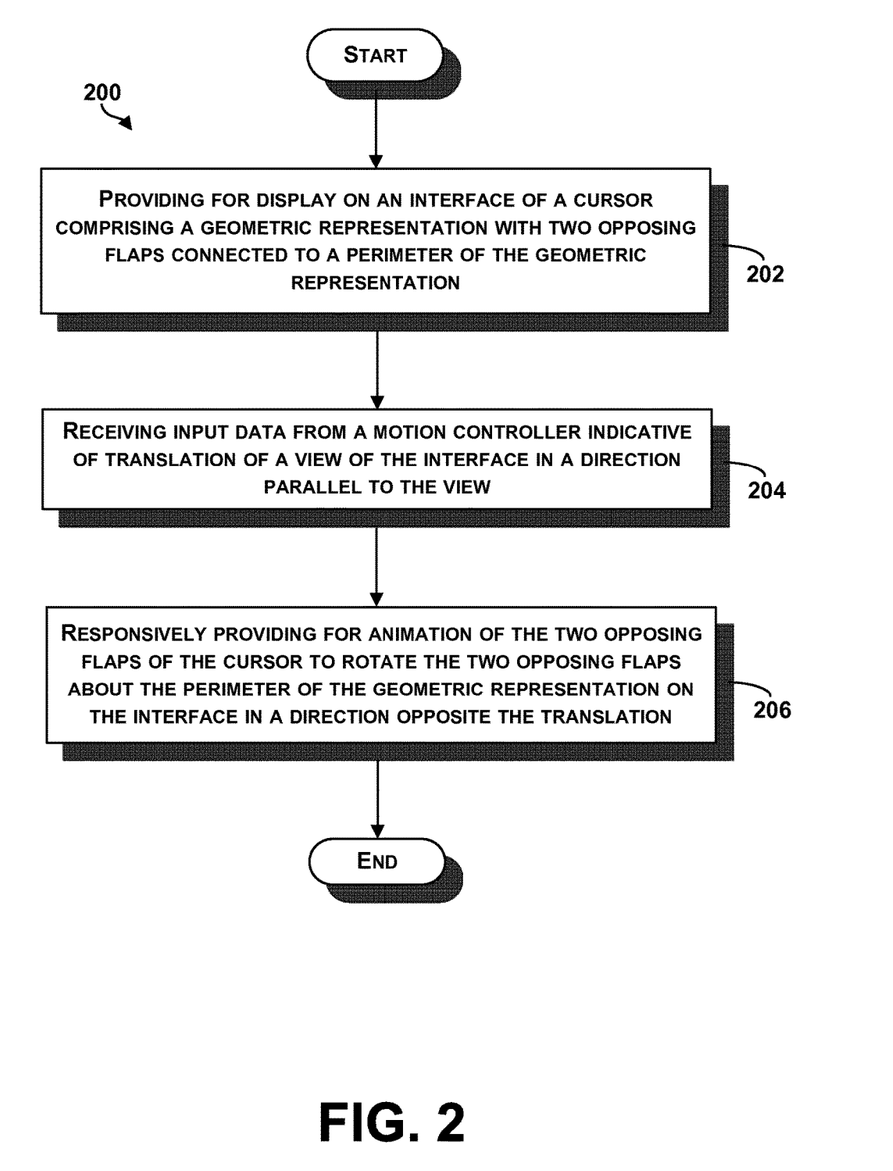
FIG. 2 is a block diagram of a method, according to an example embodiment.

FIG. 2 illustrates a flowchart showing a method 200 that may allow for display of a cursor on an interface based on input from a motion controller, according to an example embodiment. Method 200 may be carried out using an interactive display system, such as illustrated and described with respect to FIGS. 1A, 1B, 1C, and 1D. In some examples, method 200 may be executed by a control system of such a system, such as control system 180 as described with respect to FIG. 1D. Part or all of method 200 may also be executed by a local control system of a motion controller and/or a local control system of a display interface. In further examples, method 200 may be executing using input data from six-axis controller 112 to display a cursor on touchscreen 110 and/or screen panels 154. In other examples, method 200 may use input data from a different type of motion controller. Furthermore, method 200 may also involve displaying a graphical cursor on a different type of display interface. Other arrangements are also possible.

Furthermore, it is noted that the functionality described in connection with the flowcharts described herein can be implemented as special-function and/or configured general-function hardware modules, portions of program code executed by a processor for achieving specific logical functions, determinations, and/or steps described in connection with the flowchart shown in FIG. 2. Where used, program code can be stored on any type of computer-readable medium, for example, such as a storage device including a disk or hard drive.

In addition, each block of the flowchart shown in FIG. 2 may represent circuitry that is wired to perform the specific logical functions in the process. Unless specifically indicated, functions in the flowchart shown in FIG. 2 may be executed out of order from that shown or discussed, including substantially concurrent execution of separately described functions, or even in reverse order in some examples, depending on the functionality involved, so long as the overall functionality of the described method is maintained.

As shown by block 202 of FIG. 2, method 200 involves providing for display on an interface of a cursor. Within examples, a cursor is a graphical indicator on a display device that helps to orient a user. The display device includes an electronic visual display, such as touchscreen 110 and/or one or more of screen panels 154 as illustrated and described with respect to FIGS. 1A, 1B, 1C, and 1D. The cursor may be overlaid on top of a view of the display interface, or it may be placed adjacent to the view. For instance, the display interface may show a view of a particular section of Earth, and the cursor may be overlaid over a center portion of the view, placed in a corner of the view, or otherwise positioned somewhere on screen. In other examples, the cursor may be displayed on a separate display interface (e.g., a separate screen or separate screen panel) from the interface displaying a view of an environment.

The cursor includes a geometric representation with two opposing flaps connected to a perimeter of the geometric representation. Within examples, the geometric representation is one or more graphical connected or unconnected segments or curves covering a certain area on a display interface. In some examples, the geometric representation includes an enclosed or unenclosed shape, such as a circle, a square, a rectangle, a triangle, or an oval. Additionally, part of the geometric representation may be partially or fully transparent on the display interface. For instance, the geometric representation may include a ring (e.g., a circular graphical element) with opposing opaque portions that fade to become transparent at two sections of the ring between the opaque portions.

Within examples, a perimeter of the geometric representation is an edge, segment, arc, or path surrounding a portion of an area covered by the cursor. For instance, if the geometric representation includes a fully enclosed or partially transparent ring, the perimeter may be a visible arc of the ring. In some examples, the geometric representation of the cursor may include multiple nested shapes. For instance, the cursor may include an inner ring and an outer ring surrounding the inner ring. In such examples, the perimeter of the geometric representation may include portions of either the inner ring and/or the outer ring.

In some examples, the cursor further includes two opposing flaps connected to the perimeter of the geometric representation. Within examples, a flap is a graphical element connected to a portion of the perimeter that may be animated to appear rotated about the perimeter. For instance, a flap could include a shape such as a triangle, square, trapezoid, or semicircle that can appear to be three-dimensionally rotated about an axis running through a portion of the perimeter on the display interface. In some examples, the two opposing flaps may be represented directly opposite one another on the display interface (e.g., connected to portions of a ring separated by 180 degrees). In other examples, the two opposing flaps may be represented opposite one another at a different angle (e.g., connected to portions of a ring at roughly 60 degrees and 300 degrees). In further examples, the flaps may appear inside of the perimeter of the geometric representation, outside of the perimeter, or with portions both inside and outside of the perimeter.

Figure 3A:
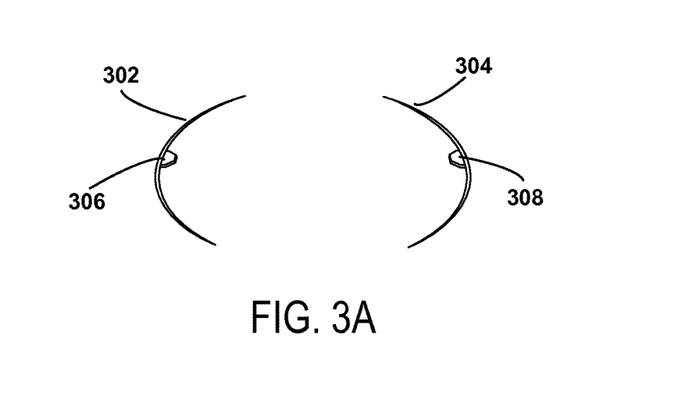
FIGS. 3A, 3B, and 3C show a cursor including a ring with opposing flaps at different rotations, according to an example embodiment.

FIG. 3A illustrates a cursor including a ring with opposing flaps, according to an example embodiment. The cursor may be displayed on a portion of a display interface, such as over the center of a screen or in a corner of the screen. In some cases, the cursor may be part of a heads-up display (HUD) window overlaid onto a view of an environment. The cursor includes a graphical ring with two opposing opaque portions 302, 304. The ring fades to become transparent in between the two opposing opaque portions. Additionally, two opposing flaps 306, 308 are connected to the opposing opaque portions 302, 304 of the ring. The opposing flaps 306, 308 are shown in FIG. 3A as being roughly level within the display, which may be their starting orientation relative to the ring and also their orientation when the view of the display is not translating forward or backward.

As shown in FIG. 3A, the opposing flaps 306, 308 may have a trapezoidal shape with a larger side connected to the two opposing opaque portions 302, 304 of the ring. This shape may simulate an appearance of airplane wings on either side of the cursor. In other examples, different shapes could be used for the opposing flaps 306, 308, as well as for the geometric representation of the cursor to which the flaps are connected.

Referring back to FIG. 2, method 200 further involves receiving input data from a motion controller, as shown by block 204. The motion controller may be an input device that allows a user to control motion on the view of the display interface along one or more degrees of freedom, such as six-axis controller 112 as illustrated and described with respect to FIG. 1. In other examples, the motion controller could be a different type of physical controller, such as a joystick or a pointing device. In other examples, the motion controller could be a digital motion controller that processes one or more different types of user input to control the view on the display. For instance, the motion controller could use depth sensing to allow a user to control movement of the view by moving one or both of her hands. In another example, the motion controller may respond to verbal instructions from a user. Other types of motion controllers which allow for control of movement along one or more degrees of freedom also may be used.

The input data from the motion controller may be indicative of translation of a view of the interface in a direction parallel to the view. More specifically, the view of the interface may translate by moving forward or backward (e.g., zooming in or zooming out) in response to input actions of the motion controller. For instance, a user may push down on a six-axis controller to cause the view to zoom in and may pull up on the six-axis controller to cause the view to zoom out. In some instances, the view may be a view of a virtual environment such as a portion of the Earth. The motion controller may then be used to control the position and an orientation of a camera from which the view of the Earth to display is determined. In other examples, the motion controller may control a moving vehicle or a different moving object within the virtual environment. In further examples, the motion controller may control a camera, vehicle, or different object within a physical environment instead of a virtual environment.

In some examples, the input data from the motion controller may only cause the view to move forward or backward (e.g., zoom in or zoom out). In other examples, the motion controller may simultaneously indicate motion along multiple degrees of freedom. For instance, the view of the display may be controlled to zoom in while also panning to the right. In such examples, the signals to move along different degrees of freedom may be processed separately (e.g., as indicating both translation in a direction parallel to the view as well as indicating translation in a direction perpendicular to the view). Such processing may occur simultaneously.

Method 200 additionally involves responsively providing for animation of the two opposing flaps of the cursor, as shown by block 206. More specifically, the flaps may be animated on the interface to rotate about the perimeter of the geometric representation of the cursor in a direction opposite the translation of the view. If the view of the display is translated forward (e.g., zoomed in), then the flaps rotate away from the direction of the view. This flap rotation simulates the effect of air pushing the flaps backward as the view moves forward, which may help orient a user as to which direction the view is moving. Additionally, if the view of the display is translated backward (e.g., zoomed out), then the flaps rotate toward the direction of the view. This flap rotation simulates the effect of air pushing the flaps forward as the view moves backward to help orient the user.

In some examples, the animation of the flaps may involve displaying one of three possible flap rotations. In particular, the flaps may be animated to be horizontal when the view is not moving forward or backward, the flaps may be animated to rotate backward when the view is moving forward, and the flaps may be animated to rotate forward when the view is moving backward.

In other examples, additional degrees of rotation of the flaps may be shown. In particular, the amount of rotation of the flaps in a particular direction may be determined based on how fast the view is translating forward or backward. As the rate that the view is moving speeds up, the flaps may rotate further from horizontal. As the rate that the view is moving slows down, the flaps may rotate closer back to horizontal. Additional animation effects may also be used to further enhance the effectiveness of the cursor in orienting a user. For instance, if the user causes the controller to start moving the view forward or backward at a high speed, the flaps of the cursor may begin to flutter to indicate the high speed.

Figure 3B:
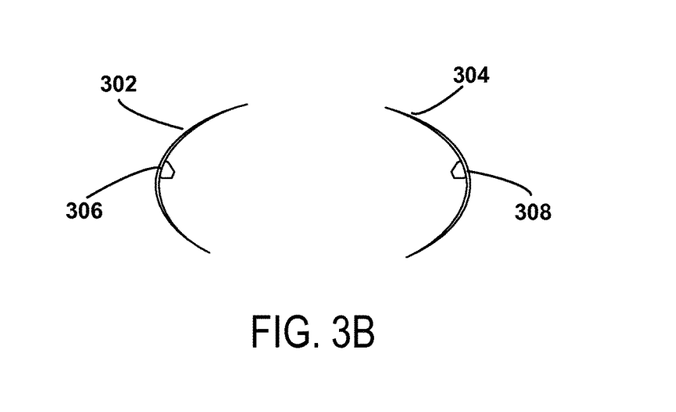

FIG. 3B illustrates a cursor including a ring with opposing flaps rotated forward, according to an example embodiment. More specifically, the flap 306 may rotate around perimeter portion 302 toward the direction of the view and the flap 308 may rotate around perimeter portion 304 toward the direction of the view. The flaps may be animated to rotate forward in response to input data from the movement controller that causes the view to move backwards or zoom out. For instance, the view of a display may show a representation of a portion of Earth, and a user may pull up on a six-axis controller to cause the view to zoom out. The cursor represented graphically somewhere on the display may be animated as shown in FIG. 3B to provide a user with an intuition that the view is moving up away from Earth.

Figure 3C:
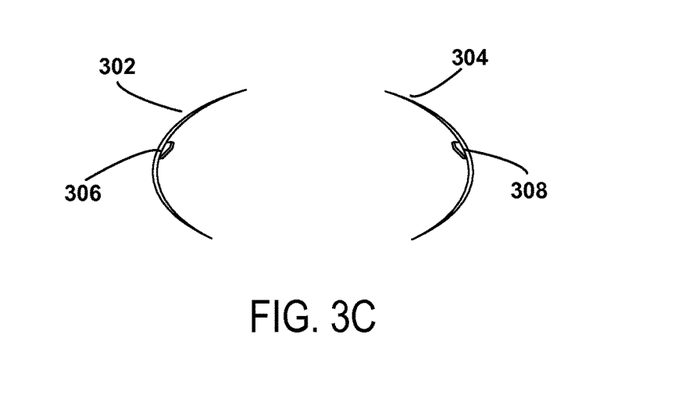

FIG. 3C illustrates a cursor including a ring with opposing flaps rotated backward, according to an example embodiment. More specifically, the flap 306 may rotate around perimeter portion 302 opposite the direction of the view and the flap 308 may rotate around perimeter portion 304 opposite the direction of the view. The flaps may be animated to rotate backward in response to input data from the movement controller that causes the view to move forward or zoom in. For instance, the view of a display may show a representation of a portion of Earth, and a user may push down on a six-axis controller to cause the view to zoom in. The cursor represented graphically somewhere on the display may be animated as shown in FIG. 3C to provide a user with an intuition that the view is moving closer towards Earth.

In further examples, a cursor may also be used to indicate rotational movement around an axis parallel to the view on a display. For instance, a motion controller such as a six-axis controller may be used to rotate the view in a clockwise or counterclockwise direction (e.g., a steering wheel turn). The view on the display may rotate in the same direction as the rotation of the motion controller with the speed of the rotation of the view increasing as more pressure is applied to the controller. The cursor may also be caused to rotate in the same direction to indicate to a user how the view is rotating. Additionally, the cursor may rotate by an amount that increases as more tension is applied to the controller to indicate how fast the view is being rotated. In particular, the positioning of the opposing flaps of the cursor relative to one another on the display may indicate both the direction and the rate of rotation of the view shown on the display.

Figure 4A:
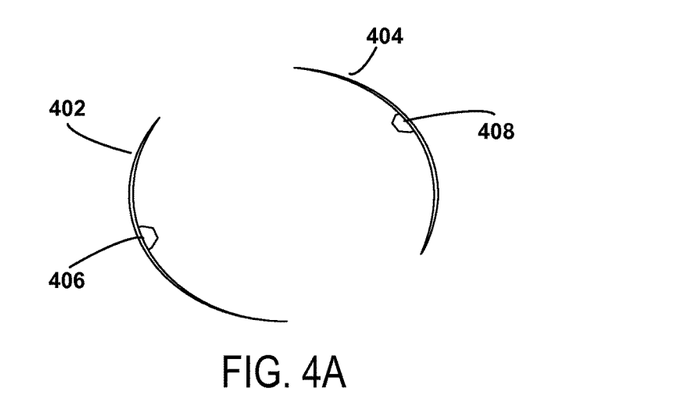
FIGS. 4A, 4B, and 4C show a cursor including a ring at different rotations, according to an example embodiment.

FIG. 4A shows a cursor including a ring rotated counterclockwise, according to an example embodiment. More specifically, the opaque portions 402, 404 of the ring may be rotated counterclockwise in response to input data from a motion controller causing the view of the display to rotate counterclockwise. Furthermore, the flaps 406, 408 connected to the respective opaque portions 402, 404 of the ring also rotate counterclockwise (e.g., stay connected to the same parts of the ring) in order to indicate the direction of rotation. As more pressure is applied to the controller to increase the counterclockwise rate of rotation, the ring and the flaps 406, 408 may rotate further in a counterclockwise direction.

In some examples, the motion controller may have a limit on a range of rotational motion around an axis parallel the view. For instance, the view may only be rotatable 180 degrees, or the view may be rotatable 360 degrees but then may not be rotated further in the same direction. In order to indicate to a user that the view has been rotated as far as it can be in a particular direction, the portion of the cursor connected to one of the flaps may be faded out. In some instances, this portion of the cursor may start to fade as the controller approaches a limit before fading to transparency when the limit has been hit.

Figure 4B:
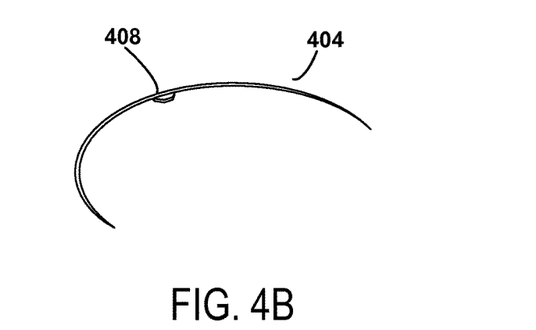

FIG. 4B shows a cursor including a ring with only one flap visible, according to an example embodiment. In particular, the opaque portion 404 of the cursor and the connected flap 408 may be visible on the display. The opposing opaque portion and connected flap may be transparent to indicate that the motion controller has hit a limit on a range of rotational motion. For instance, the view of the display may have been rotated counterclockwise as far as the system allows. In such a scenario, only clockwise rotation of the view with the motion controller may be permitted.

Figure 4C:
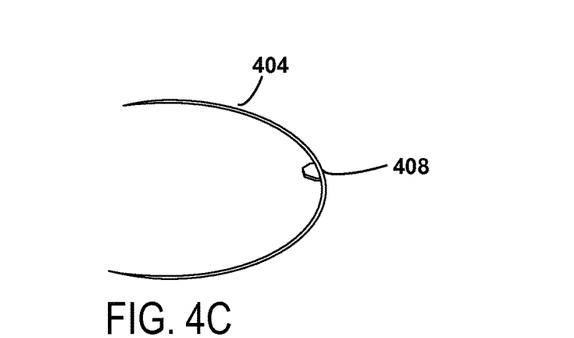

FIG. 4C shows another view of the cursor including a ring with only one flap visible, according to an example embodiment. In particular, the opaque portion 404 of the cursor and the connected flap 408 may now be rotated clockwise from the position shown in FIG. 4B in response to clockwise rotation of the motion controller. The opposing opaque portion and connected flap may stay transparent as the motion controller rotates the view clockwise so that the user stays oriented with the direction of the rotation. When the controller stops rotating the view, both flaps may again become visible.

In additional examples, a separate portion of the cursor, such as an additional ring, may be used to indicate horizontal translation. More specifically, input data from the motion controller may indicate that the view is being translated in a direction perpendicular to the view. For instance, the view may be controlled by the motion controller to pan up, down, left, and/or right. In some examples, the cursor may indicate the direction of horizontal translation with an arrow connected to the separate portion of the cursor. In some examples, the separate portion of the cursor may be animated separately and simultaneously with the rest of the cursor to simultaneously show motion along different degrees of freedom.

Figure 5A:
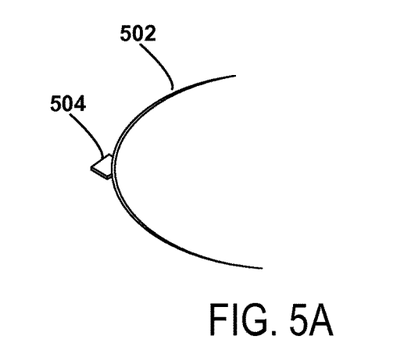
FIGS. 5A, 5B, and 5C show a cursor including a ring with an arrow pointing in different directions, according to an example embodiment.

FIG. 5A shows a cursor including a ring with a connected arrow, according to an example embodiment. In particular, the ring may include an opaque portion 502 with a connected arrow 504 pointing to the left as shown. The opposite side of the ring from the arrow 504 may be faded out on the screen. The opaque portion 502 and the connected arrow 504 indicate that the view is being translated to the left by the motion controller. In some examples, the ring with the connected arrow may be shown in addition to the ring with the connected flaps illustrated in FIG. 3A. For instance, the ring with the connected arrow may be positioned outside or inside of the ring with the connected flaps. A cursor may show motion along certain degrees of freedom with one ring and simultaneously show motion along other degrees of freedom with the second ring.

Figure 5B:
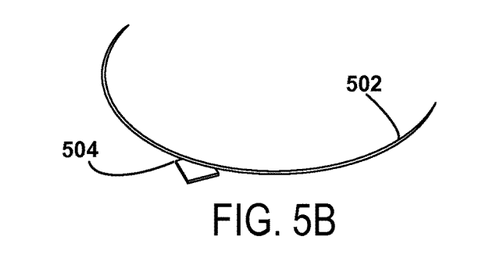

FIG. 5B shows a cursor including a ring with a connected arrow pointing in a different direction, according to an example embodiment. In particular, the the arrow 504 now points down and to the left. The cursor may be changed to this positioning in response to input data from a motion controller indicating that the view of the display is now being translated down and to the left. The arrow 504 may be animated to rotate from its position on the ring shown in FIG. 5A around the ring to the position shown in FIG. 5B to indicate the new direction of translation. Additionally, the opaque portion 504 of the ring may be changed from the section displayed in FIG. 5A to the section displayed in FIG. 5B to further indicate the new direction of horizontal rotation.

Figure 5C:
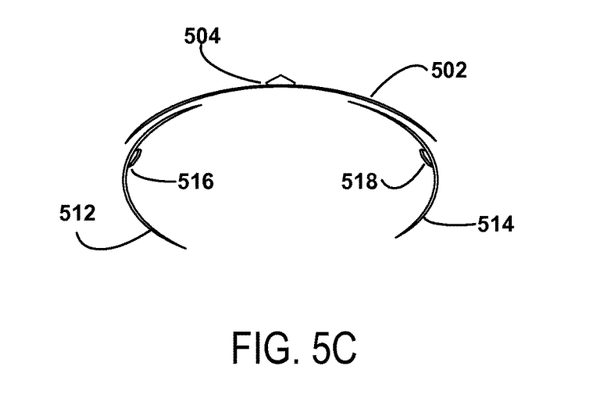

FIG. 5C shows a cursor including an outer ring with a connected arrow and an inner ring with connected flaps, according to an example embodiment. More specifically, the outer ring may include an opaque portion 502 and a connected arrow 504 to indicate a direction of horizontal translation of the view. In particular, input data from the motion controller may indicate that the view is being horizontally translated up. Accordingly, the arrow 504 of the outer ring points up. Additionally, an inner ring positioned inside the outer ring includes opposing opaque portions 512, 514 with connected flaps 516, 518. The flaps 516, 518 of the inner ring are rotated up away from the view indicating that the view is also being translated forward by the motion controller. Accordingly, the outer ring and inner ring simultaneously indicate two different directions of translation of the view (e.g., up and forward). In other examples, motion along more than two degrees of freedom may be represented simultaneously by two separate geometrical portions of a cursor.

In additional examples, the cursor may be used to indicate when the motion controller has caused the view of the display to tilt forward or backward. For instance, a six-axis controller may be rotated forward or backward in order to tilt the view forward or backward. Within examples, the entire cursor may tilt forward or backward on the display to indicate the direction of the tilt in response to input data from the motion controller indicating that the view is being tilted forward or backward. Further, the degree of tilt of the cursor may correspond to how fast the view is being tilted on the display. In other examples, the cursor may be tilted left or right based on input data from a motion controller tilting the view left or right as well or instead.

In further examples, a portion of the cursor which is tilted in the direction of the view (e.g., away from the perspective of a user) may become more opaque within the display and a portion of the cursor which tilted away from the direction of the view (e.g., toward the perspective of a user) may become more transparent. This effect may help to orient the user to the direction that the view is tilting. In some examples, the cursor may include a ring with opposing transparent sides on the top and bottom which have the same length when the view is not being tilted forward or backward. Then, as the view is tilted forward, the transparent side of the ring on the bottom becomes larger while the transparent side of the ring on the top becomes smaller. Similarly, as the view is tilted backward, the transparent side of the ring on the bottom becomes smaller while the transparent side of the ring on the top becomes larger.

Figure 6A:
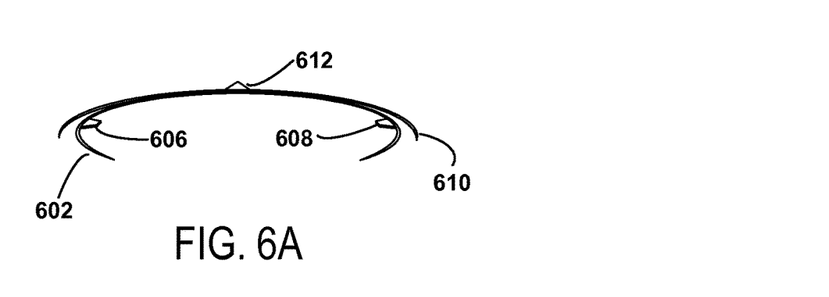
FIGS. 6A and 6B show a cursor tilted at different angles, according to an example embodiment.

FIG. 6A shows a cursor tilted forward, according to an example embodiment. The cursor may include an inner ring 602 with opposing flaps 606, 608 connected to the inner ring 602. The cursor may additionally include an outer ring 610 with a directional arrow 612 to a show a direction of horizontal translation of the view. Input data from a motion controller may indicate that the view is being tilted forward. In response, both the inner ring 602 and the outer ring 610 of the cursor may be tilted forward as shown in FIG. 6A. Additionally, the top part of the inner ring 602 may become more opaque while the bottom part of the inner ring 602 becomes more transparent to further orient the user to the direction of the tilt. Accordingly, the part of the inner ring 602 that is perceived to be furthest from the user is in full view while the part of the inner ring 602 perceived to be closest to the user will fade to transparency.

Figure 6B:
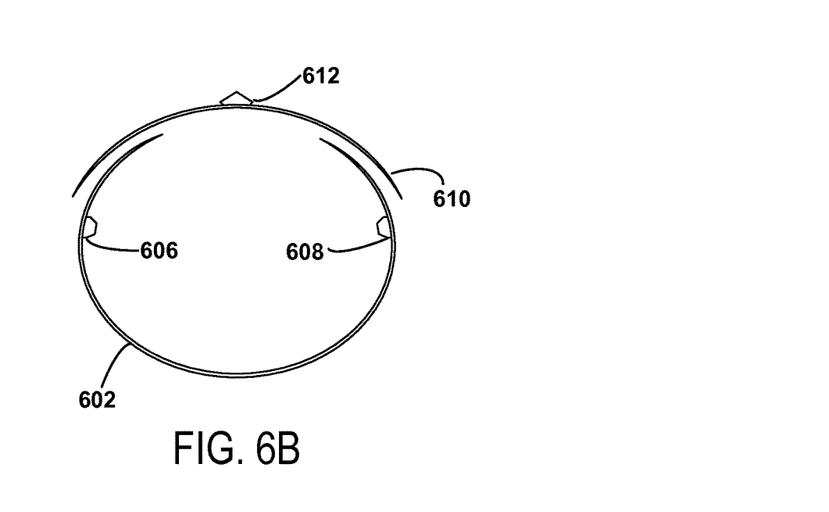

FIG. 6B shows a cursor tilted backward, according to an example embodiment. In this example, input data from a motion controller may indicate that the view is being tilted backward. In response, both the inner ring 602 and the outer ring 610 of the cursor may be tilted backward as shown in FIG. 6B. Additionally, the bottom part of the inner ring 602 may become more opaque while the top part of the inner ring 602 becomes more transparent to further orient the user to the direction of the tilt. Accordingly, as in the example illustrated by FIG. 6A, the part of the inner ring 602 that is perceived to be furthest from the user is in full view while the part of the inner ring 602 perceived to be closest to the user will fade to transparency.

Within examples, a cursor may be used to indicate simultaneous motion along multiple degrees of freedom. In some examples, a motion controller may only be capable of controlling motion along certain degrees of freedom, but not others. In other examples, the motion controller may be a six-axis controller capable of controlling motion along all six degrees of freedom. A cursor may be used to indicate motion along any of the degrees of freedom controllable by a particular motion controller. Accordingly, up to six different actions may be indicated by the cursor independently and simultaneously in a simple and clean format.

Figure 7:
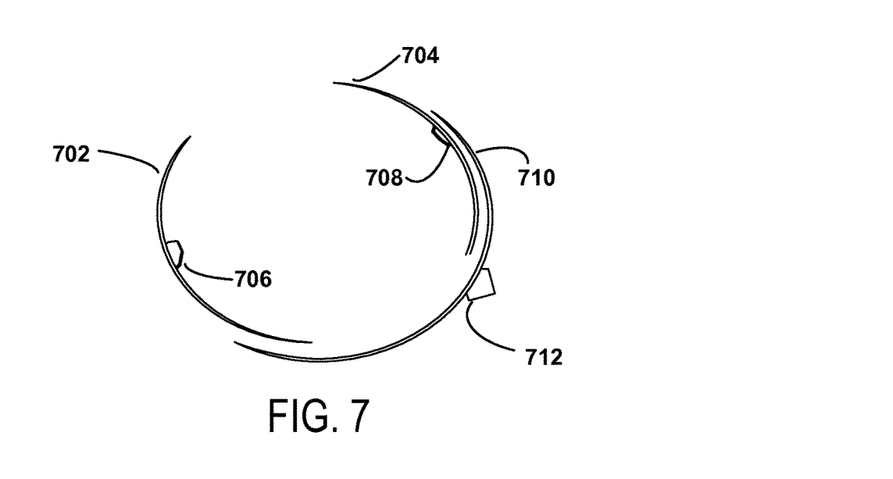
FIG. 7 shows another cursor, according to an example embodiment.

FIG. 7 illustrates another example cursor, according to an example embodiment. In this illustrative example, motion along five different degrees of freedom is indicated by the cursor. In particular, the cursor includes an inner ring with opposing opaque portions 702, 704 with connected flaps 706, 708. The flaps 706, 708 are rotated away from the view, indicating that the view is being translated forward (e.g., zooming in). Additionally, the opaque portions 702, 704 and connected flaps 706, 708 of the inner ring are rotated counterclockwise, indicating that the view is being rotated counterclockwise. Further, the cursor includes an outer ring 710 with a connected arrow 712. The arrow 712 is pointing down and to the right, indicating that view is being horizontally translated both down and to the right. Lastly, both the inner ring and outer ring of the cursor are tilted backwards indicating that the view is being tilted backwards. In further examples, many other combinations of motion in multiple directions may also be indicated by the cursor.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
providing for display on an interface, by a computing device, of a cursor comprising a geometric representation with two opposing flaps connected to a perimeter of the geometric representation;
receiving input data from a motion controller indicative of translation of a view of the interface in a direction parallel to the view; and
responsively providing for animation, by the computing device, of the two opposing flaps of the cursor to rotate the two opposing flaps about the perimeter of the geometric representation on the interface in a direction opposite the translation.

2. The method of claim 1, wherein the animation comprises rotating the two opposing flaps of the cursor by an amount that is proportional to a rate of the translation.

3. The method of claim 1, wherein the computing device is operated to display the cursor as a circular shape having opposing opaque portions that are connected to the respective opposing flaps, wherein the circular shape fades to become more transparent in between the opposing opaque portions.

4. The method of claim 1, further comprising:
receiving input data from the motion controller indicative of rotation of the view of the interface around an axis parallel to the view; and
causing the geometric representation with the two opposing flaps of the cursor to rotate on the interface in a direction of the rotation of the view.

5. The method of claim 1, wherein the cursor comprises an inner circular shape connected to the opposing flaps and an outer circular shape surrounding the inner circular shape, the method further comprising:
receiving input data from the motion controller indicative of horizontal translation of the view of the interface in a direction perpendicular to the view; and
providing for display on the interface of an arrow that is connected to the outer circular shape of the cursor and points in a direction of the horizontal translation.

6. The method of claim 5, further comprising:
receiving input data from the motion controller indicative of horizontal translation in a different direction perpendicular to the view; and
causing the arrow to move around outer circular shape of the cursor on the interface to point in the different direction.

7. The method of claim 1, further comprising:
receiving input data from the motion controller indicative of tilting of the view of the interface; and
responsively causing the geometric representation of the cursor to tilt on the interface in a direction of the tilting.

8. The method of claim 7, further comprising:
causing a portion of the geometric representation of the cursor that is tilted toward the direction of view of the interface to become less transparent on the interface; and
causing a portion of the geometric representation of the cursor that is tilted away from a direction of the view of the interface to become more transparent on the interface.

9. A system comprising:
a motion controller; and
a control system configured to:
provide for display on a display interface of a cursor comprising a geometric representation with two opposing flaps connected to a perimeter of the geometric representation;
receive input data from the motion controller indicative of translation of a view of the display interface in a direction parallel to the view; and
responsively provide for animation of the two opposing flaps of the cursor to rotate the two opposing flaps about the perimeter of the geometric representation on the display interface in a direction opposite the translation.

10. The system of claim 9, wherein the motion controller comprises a six-axis controller.

11. The system of claim 9, wherein the animation comprises rotating the two opposing flaps of the cursor by an amount that is proportional to a rate of the translation.

12. The system of claim 9, wherein the control system is configured to display the cursor as a circular shape having opposing opaque portions that are connected to the respective opposing flaps, wherein the circular shape fades to become more transparent in between the opposing opaque portions.

13. The system of claim 9, wherein the control system is further configured to:
receive input data from the motion controller indicative of rotation of the view of the display interface around an axis parallel to the view; and
responsively cause the geometric representation with the two opposing flaps of the cursor to rotate on the display interface in a direction of the rotation of the view.

14. The system of claim 13, wherein the control system is further configured to:
determine that the rotation of the view of the display interface around the axis parallel to the view has reached a limit on a range of rotational motion; and
responsively cause a portion of the geometric representation connected to one of the two opposing flaps to become transparent on the display interface.

15. The system of claim 9, wherein the cursor comprises an inner circular shape connected to the opposing flaps and an outer circular shape surrounding the inner circular shape, and the control system is further configured to:
receive input data from the motion controller indicative of horizontal translation of the view of the display interface in a direction perpendicular to the view; and
provide for display on the display interface of an arrow that is connected to the outer circular shape of the cursor and points in a direction of the horizontal translation.

16. The system of claim 9, wherein the control system is further configured to:
receive input data from the motion controller indicative of tilting of the view of the display interface; and
responsively cause the geometric representation of the cursor to tilt on the display interface in a direction of the tilting.

17. A non-transitory computer readable medium having stored therein instructions, that when executed by one or more computing systems, cause the one or more computing systems to perform functions comprising:
providing for display on an interface of a cursor comprising a geometric representation with two opposing flaps connected to a perimeter of the geometric representation;
receiving input data from a motion controller indicative of translation of a view of the interface in a direction parallel to the view; and
responsively providing for animation of the two opposing flaps of the cursor to rotate the two opposing flaps about the perimeter of the geometric representation on the interface in a direction opposite the translation.

18. The non-transitory computer readable medium of claim 17, wherein the animation comprises rotating the two opposing flaps of the cursor by an amount that is proportional to a rate of the translation.

19. The non-transitory computer readable medium of claim 17, wherein the cursor comprises a circular shape having opposing opaque portions that are connected to the respective opposing flaps, and wherein the circular shape fades to become more transparent in between the opposing opaque portions.

20. The non-transitory computer readable medium of claim 17, wherein the cursor comprises an inner circular shape connected to the opposing flaps and an outer circular shape surrounding the inner circular shape, the functions further comprising:
- receiving input data from the motion controller indicative of horizontal translation of the view of the interface in a direction perpendicular to the view; and
- providing for display on the interface of an arrow that is connected to the outer circular shape of the cursor and points in a direction of the horizontal translation.

* * * * *